US011948495B2

(12) United States Patent
Liu

(10) Patent No.: US 11,948,495 B2
(45) Date of Patent: Apr. 2, 2024

(54) DRIVING CIRCUIT, DRIVING METHOD AND DISPLAY DEVICE

(71) Applicant: TCL CHINA STAR OPTOELECTRONICS TECHNOLOGY CO., LTD., Shenzhen (CN)

(72) Inventor: Jinfeng Liu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 348 days.

(21) Appl. No.: 17/425,710

(22) PCT Filed: May 18, 2021

(86) PCT No.: PCT/CN2021/094325
§ 371 (c)(1),
(2) Date: Jul. 23, 2021

(87) PCT Pub. No.: WO2022/142075
PCT Pub. Date: Jul. 7, 2022

(65) Prior Publication Data

US 2023/0368722 A1 Nov. 16, 2023

(30) Foreign Application Priority Data

Dec. 31, 2020 (CN) ......................... 202011632104.6

(51) Int. Cl.
*G09G 3/20* (2006.01)
*G09G 3/36* (2006.01)

(52) U.S. Cl.
CPC ......... *G09G 3/2096* (2013.01); *G09G 3/3685* (2013.01); *G09G 2310/0291* (2013.01); *G09G 2320/0673* (2013.01)

(58) Field of Classification Search
CPC ....... G09G 2330/021; G09G 2320/041; G09G 2320/0673; G09G 3/3696; G09G 2310/027
See application file for complete search history.

(56) References Cited

U.S. PATENT DOCUMENTS

2016/0365058 A1* 12/2016 Nam .................... G09G 3/3696
2018/0158397 A1* 6/2018 Nam .................... G09G 3/3696

FOREIGN PATENT DOCUMENTS

CN 102789769 A 11/2012
CN 203787066 U 8/2014
(Continued)

OTHER PUBLICATIONS

International Search Report in International application No. PCT/CN2021/094325, dated Sep. 16, 2021.
(Continued)

*Primary Examiner* — Koosha Sharifi-Tafreshi
(74) *Attorney, Agent, or Firm* — PV IP PC; Wei Te Chung; Zhigang Ma

(57) ABSTRACT

A driving circuit, a driving method and a display device are provided. The driving circuit is used to driving a display panel. The driving circuit includes at least one source driving chip, a timing controller and a power management circuit chip. The power management circuit chip outputs a data driving voltage and a gamma voltage to the at least one source driving chip. The source driving chip determines whether a voltage difference between the data driving voltage and the gamma voltage is within a predetermined range. Based on a result of the determination, the driving circuit decides whether to adjust the driving voltage and the gamma voltage.

17 Claims, 5 Drawing Sheets

(56) References Cited

FOREIGN PATENT DOCUMENTS

| | | | |
|---|---|---|---|
| CN | 107564448 | A | 1/2018 |
| CN | 109545123 | A | 3/2019 |
| CN | 110164393 | A | 8/2019 |
| CN | 110675794 | A | 1/2020 |
| CN | 112735348 | A | 4/2021 |

OTHER PUBLICATIONS

Written Opinion of the International Searching Authority in International application No. PCT/CN2021/094325, dated Sep. 16, 2021.
Chinese Office Action in corresponding Chinese Patent Applicant No. 202011632104.6 dated Dec. 22, 2021, pp. 1-10.

* cited by examiner

DRIVING CIRCUIT, DRIVING METHOD AND DISPLAY DEVICE

FIELD OF THE DISCLOSURE

The present invention relates to display technologies, and more particularly to a driving circuit, a driving method and a display device.

DESCRIPTION OF RELATED ARTS

With rapid development of display technologies, the size of liquid crystal display panels is getting bigger and bigger. The loading becomes heavier and heavier for driving circuits used to drive the liquid crystal display panels. Under some particular image screens with heavy loading, driving current will increase a lot as compared to normal operations. This causes a data driving voltage (VAA) to encounter a voltage drop due to draining by a load. VAA and GAMMA voltages are supplied to a source driving chip by a Power Management IC (PMIC). VAA is a celling voltage of an output buffer module inside a driving chip. GAM1 voltage is the highest binding-point grayscale voltage. Under a heavy loading image screen, VAA voltage drops down too much, ripple voltage is too high, and these will cause the voltage difference ΔU between the VAA and GAM1 voltages to approach to zero volts. For an image screen of a pure color, data voltages of parts of scanning rows will be lower than the binding-point voltage GAM1 (while other scanning rows operates normally), and this cases parts of the area of the pure color image screen to appear white. Therefore, it needs to ensure that the voltage different ΔU between VAA and GAM1 is greater than zero volt and maintains at a certain amount of allowance. Besides, if ΔU is too large, it will cause the temperature of the output buffer to be out of range. Therefore, ΔU needs to be kept within a reasonable range of reference values.

However, for now, no available mechanism can ensure ΔU to satisfy the requirement of reference values all the time. Therefore, driving circuits in the existing art needs improvements.

SUMMARY

Technical Problems

Embodiments of the present invention provide a driving circuit, a driving method and a display device for solving the problem of abnormal heavy loading image screen in the existing driving circuit, caused when the voltage difference between VAA and GAMMA voltages approaches to zero volt, which is caused by a voltage drop of VAA due to draining by a load under an image screen with heaving loading.

Technical Solutions

To solve above problems, the technical solutions provided in the present application are described below.

An embodiment of the present invention provides a driving circuit, for driving a display panel, including at least one source driving chip connected to the display panel, a timing controller and a power management circuit chip. The timing controller is connected to the at least one source driving chip. A first end of the power management circuit chip is connected to the timing controller and a second end of the power management circuit chip is connected to the at least one source driving chip. The power management circuit chip outputs a data driving voltage and a gamma voltage to each source driving chip. The source driving chip determines whether a voltage difference between the data driving voltage and the gamma voltage is within a predetermined range, and based on a result of the determination the driving circuit decides whether to adjust the data driving voltage and the gamma voltage.

In at least one embodiment of the present invention, the source driving chip determines whether the voltage difference is within the predetermined range, and if yes, the source driving chip outputs a driving signal to the display panel; if no, the source driving chip outputs a voltage difference signal to the timing controller, the timing controller transmits a control signal, and the driving circuit adjusts the driving voltage and/or the gamma voltage based on the control signal.

In at least one embodiment of the present invention, the source driving chip includes a voltage comparator, and the voltage comparator compares the voltage difference between the data driving voltage and the gamma voltage that are received by the source driving chip and determines whether the voltage difference is within the predetermined range.

In at least one embodiment of the present invention, the source driving chip further includes an output buffer connected to the voltage comparator, and the output buffer is configured to output the driving signal to the display panel.

In at least one embodiment of the present invention, the power management circuit chip includes a data register, and the data register is configured to store set values of the data driving voltage and the gamma voltage.

In at least one embodiment of the present invention, the timing controller transmits the control signal to rewrite the set values of the data driving voltage and/or the gamma voltage stored in the data register.

In at least one embodiment of the present invention, the power management circuit chip further includes a voltage calibrating module connected to the data register, and based on the rewritten set values of the data driving voltage and/or the gamma voltage, the voltage calibrating module adjusts the outputted data driving voltage and/or gamma voltage.

In at least one embodiment of the present invention, the voltage calibrating module includes a control module and a voltage conversion circuit, and the control module and the voltage conversion circuit are configured to adjust the outputted data driving voltage and/or gamma voltage.

In at least one embodiment of the present invention, both the voltage difference signal and the control signal are digital signals.

An embodiment of the present invention further provides a driving method of a display panel, including:

S10, providing a driving circuit including at least one source driving chip connected to the display panel, a timing controller connected to the at least one source driving chip and a power management circuit chip, wherein a first end of the power management circuit chip is connected to the timing controller and a second end of the power management circuit chip is connected to the at least one source driving chip;

S20, outputting, by the power management circuit chip, a data driving voltage and a gamma voltage to each source driving chip; and S30, determining, by the source driving chip, whether a voltage difference between the data driving voltage and the gamma voltage is within a predetermined range and deciding, by the driving circuit based on a result of the determination, whether to adjust the data driving voltage and the gamma voltage.

In at least one embodiment of the present invention, S30 includes:

determining, by a voltage comparator of the source driving chip, whether the voltage difference is within the predetermined range;

if yes, outputting, by the source driving chip, a driving signal to the display panel; and if no, outputting, by the source driving chip, a voltage difference signal to the timing controller, transmitting, by the timing controller, a control signal, and adjusting, by the driving circuit, the driving voltage and/or the gamma voltage based on the control signal.

An embodiment of the present invention further provides a display device including a display panel and the afore-described driving circuit. The driving circuit is connected to the display panel. The driving circuit is configured to drive the display panel. The driving circuit includes at least one source driving chip connected to the display panel, a timing controller and a power management circuit chip. The timing controller is connected to the at least one source driving chip. A first end of the power management circuit chip is connected to the timing controller and a second end of the power management circuit chip is connected to the at least one source driving chip. The power management circuit chip outputs a data driving voltage and a gamma voltage to each source driving chip. The source driving chip determines whether a voltage difference between the data driving voltage and the gamma voltage is within a predetermined range, and based on a result of the determination the driving circuit decides whether to adjust the data driving voltage and the gamma voltage.

In at least one embodiment of the present invention, the source driving chip determines whether the voltage difference is within the predetermined range, and if yes, the source driving chip outputs a driving signal to the display panel; if no, the source driving chip outputs a voltage difference signal to the timing controller, the timing controller transmits a control signal, and the driving circuit adjusts the driving voltage and/or the gamma voltage based on the control signal.

In at least one embodiment of the present invention, the source driving chip includes a voltage comparator, and the voltage comparator compares the voltage difference between the data driving voltage and the gamma voltage that are received by the source driving chip and determines whether the voltage difference is within the predetermined range.

In at least one embodiment of the present invention, the source driving chip further includes an output buffer connected to the voltage comparator, and the output buffer is configured to output the driving signal to the display panel.

In at least one embodiment of the present invention, the power management circuit chip includes a data register, and the data register is configured to store set values of the data driving voltage and the gamma voltage.

In at least one embodiment of the present invention, the timing controller transmits the control signal to rewrite the set values of the data driving voltage and/or the gamma voltage stored in the data register.

In at least one embodiment of the present invention, the power management circuit chip further includes a voltage calibrating module connected to the data register, and based on the rewritten set values of the data driving voltage and/or the gamma voltage, the voltage calibrating module adjusts the outputted data driving voltage and/or gamma voltage.

In at least one embodiment of the present invention, the voltage calibrating module includes a control module and a voltage conversion circuit, and the control module and the voltage conversion circuit are configured to adjust the outputted data driving voltage and/or gamma voltage.

In at least one embodiment of the present invention, both the voltage difference signal and the control signal are digital signals.

Beneficial Effects

The source driving chip feeds back to the timing controller a message indicating the voltage difference ΔU between the data driving voltage and the gamma voltage, and then the timing controller transmits a control signal to the power management circuit chip to rewrite set values of the data driving voltage and the gamma voltage in the power management circuit chip so as to adjust the data driving voltage and the gamma voltage outputted by the power management circuit chip and provide the adjusted data driving voltage and gamma voltage to the source driving chip at the back-end, thereby realizing real-time detecting and altering ΔU and ensuring ΔU to be within a reasonable predetermined range. Therefore, it is ensured that the display panel display images normally even on a heavy loading screen and over-heating of the source driving chip 12 is avoided. In addition, the driving circuit provided in the present invention will not add hardware-designed circuits and manufacture cost.

DESCRIPTION OF EMBODIMENTS OF THE DISCLOSURE

The present application provides a driving circuit, a driving method and a display device. To make the objectives, technical schemes, and effects of the present application more clear and specific, the present application is described in further detail below with reference to the embodiments in accompanying with the appending drawings. It should be understood that the specific embodiments described herein are merely for interpreting the present application and the present application is not limited thereto.

In the existing driving circuit, for an image screen with heavy loading, driving current increases a lot as compared to normal operations and data driving voltage will drop down too much, and this results in the fact that a voltage difference between data driving voltage and gamma voltage approaches zero volt, causing an abnormal displaying of the heavy loading image screen. To solve this technical problem, the present invention provides embodiments to overcome its defect.

Figure 1:
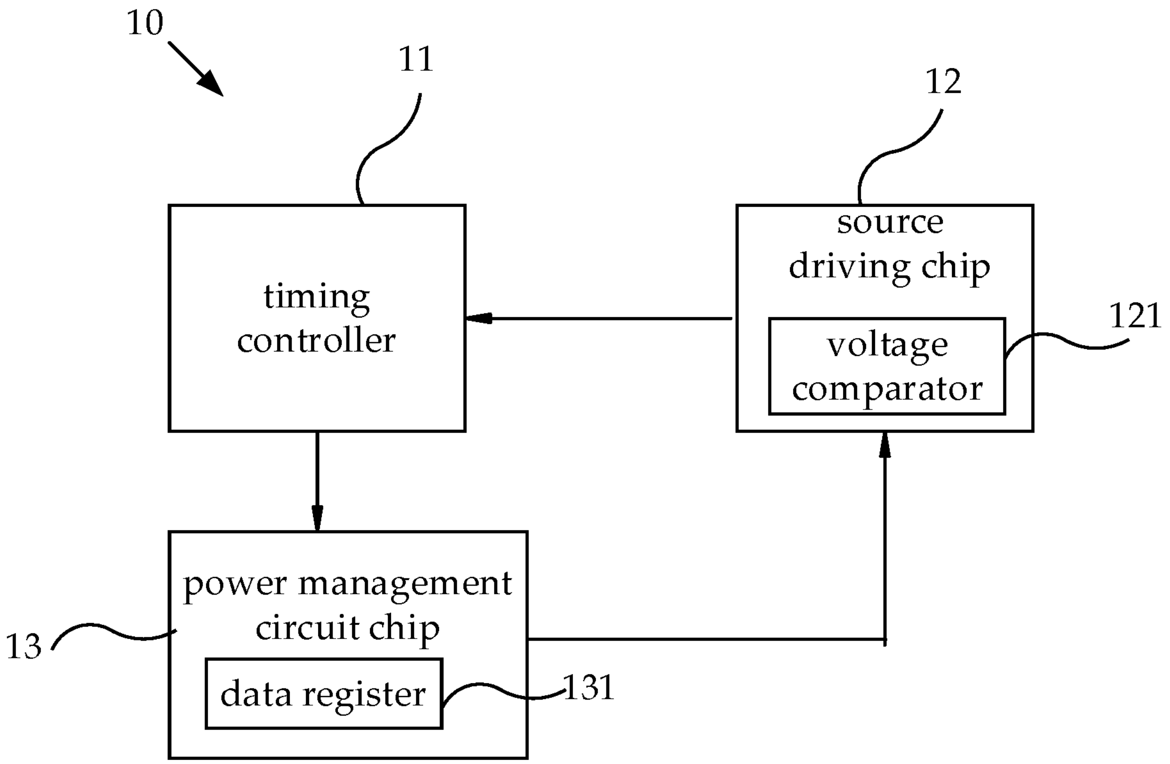
FIG. 1 is a structural schematic diagram illustrating a driving circuit provided in an embodiment of the present invention.

Referring to FIG. 1, an embodiment of the present invention provides a driving circuit 10. The driving circuit 10 is configured to drive a display panel 20. The driving circuit 10 includes at least one source driving chip 12, a power management circuit chip (PMIC) 13 and a timing controller (CTON) 11.

The source driving chip 12 is connected to the display panel 20. The source driving chip 12 provides a data voltage Vdata for the display panel 20 to charge pixels in the display panel 20.

The timing controller 11 is connected to the at least one source driving chip 12. The timing controller 11 transmits to the source driving chip 12 a timing signal for driving the display panel 20.

The power management circuit chip 13 includes a first end and a second end. The first end is connected to the timing controller 11 and the second end is connected to the at least one source driving chip 12. The power management circuit chip 13 supplies electric power to the timing controller 11 and outputs a data driving voltage VAA and a gamma voltage Vgamma to the at least one source driving chip 12.

The data driving voltage VAA is an analog power voltage. The data driving voltage VAA is a ceiling voltage of an output buffer 122 inside the source driving chip 12. The gamma voltage Vgamma is the highest binding-point grayscale voltage. For the image screen with heavy loading, the data driving voltage drops too much and ripple voltage is too large, and this causes a voltage difference ΔU between the data driving voltage VAA and the gamma voltage Vgamma to approach to 0. For an image screen of a pure color, data voltages of parts of scanning rows will be lower than the gamma voltage Vgamma, and this cases parts of the area of the pure color image screen to appear white. Therefore, it needs to ensure that ΔU is greater than zero volt and maintains at a certain amount of allowance. Besides, ΔU should not be too large. Otherwise, it will cause the temperature of the source driving chip to be out of range.

For solving above problem, embodiments of the present invention utilize the source driving chip 12 to determine whether the voltage difference ΔU between the data driving voltage and the gamma voltage is within a predetermined range and utilize the Gamma driving circuit 10 to decide, based on a result of the determination, whether to adjust the data driving voltage VAA and the gamma voltage Vgamma.

In an embodiment, the source driving chip 12 can feed back to the timing controller 11 a message indicating that the voltage difference ΔU between the data driving voltage VAA and the gamma voltage Vgamma exceeds the predetermined range, and then the timing controller 11 transmits a control signal to rewrite set values of the data driving voltage VAA and the gamma voltage Vgamma in the power management circuit chip 13. Based on the rewritten set values, the power management circuit chip 13 outputs adjusted values of the data driving voltage VAA and the gamma voltage Vgamma and provides that to the source driving chip 12 at the backend, thereby realizing real-time detecting and altering ΔU and ensuring ΔU to be within the reasonable predetermined range.

Specifically, the source driving chip 12 determines whether the voltage difference ΔU between the data driving voltage VAA and the gamma voltage Vgamma is within a predetermined range. If yes, the source driving chip 12 outputs a driving signal to the display panel 20; if no, the source driving circuit 12 outputs a voltage difference signal to the timing controller 11, the timing controller 11 transmits, a control signal, and based on the control signal the driving circuit 10 adjusts the driving voltage VAA and/or the gamma voltage Vgamma.

Furthermore, based on the received voltage difference signal, the timing controller 11 outputs the control signal to the power management circuit chip 13 to rewrite the set values of data driving voltage VAA and/or the gamma voltage Vgamma stored in the power management circuit chip 13.

In an embodiment, both the voltage difference signal and the control signal are digital signals.

A message carried on the voltage difference signal is a value of the voltage difference ΔU between the data driving voltage VAA and the gamma voltage Vgamma.

A message carried on the control signal includes set values of the data driving voltage VAA and/or the gamma voltage Vgamma that are required to be rewritten.

Based on the rewritten set values, the power management circuit chip 13 outputs again the data driving voltage VAA and the gamma voltage Vgamma that have ΔU satisfying the foregoing threshold range.

In an embodiment, the threshold range of the voltage difference ΔU can be set as 0.8V to 2V, that is, $0.8V<\Delta U<2V$, such that the display panel operates normally and it is ensured that the temperature of the source driving chip 12 will not rise too high.

In an embodiment, the source driving chip 12 includes a voltage comparator 121 configured to compare the voltage difference ΔU between the data driving voltage VAA and the gamma voltage Vgamma that are received by the source driving chip 12 and determine whether the voltage difference ΔU is within the predetermined range.

In an embodiment, the power management circuit chip 13 includes a data register 131 configured to store the set values of the data driving voltage VAA and the gamma voltage Vgamma.

The timing controller 11 transmits the control signal to rewrite the set values of the data driving voltage VAA and/or the gamma voltage Vgamma stored in the data register 131 to adjust outputted data driving voltage VAA and/or gamma voltage Vgamma such that the voltage difference ΔU between the outputted data driving voltage VAA and gamma voltage Vgamma is within the predetermined range.

Figure 2:
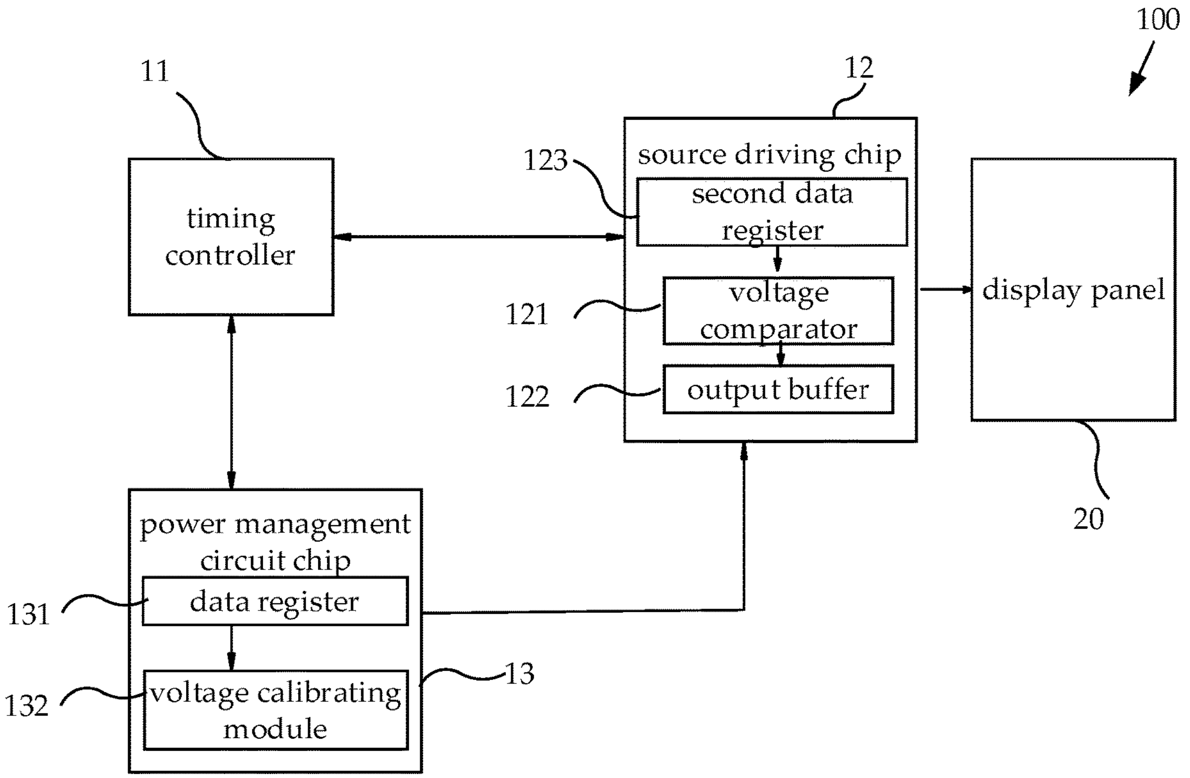
FIG. 2 is a structural schematic diagram illustrating a display device provided in an embodiment of the present invention.

Referring to FIG. 2, the power management circuit chip 13 may further include a voltage calibrating module 132 connected to the data register 131, and based on the rewritten set values of the data driving voltage VAA and/or the gamma voltage, the voltage calibrating module 132 adjusts the outputted data driving voltage VAA and/or gamma voltage Vgamma.

Specifically, the voltage calibrating module 132 includes a control module and a voltage conversion circuit. The control module and the voltage conversion circuit are utilized to adjust the outputted data driving voltage VAA and/or gamma voltage Vgamma.

Taking the data driving voltage VAA for example, the timing controller 11 transmits the control signal to rewrite the set value of the data driving voltage VAA stored in the data register 131, and based on the rewritten set value of the data driving voltage VAA, the control module adjusts a duty ratio (an ON period of a scanning signal) of a switch module used in the voltage conversion circuit to adjust the value of the data driving voltage VAA. In such a way, it affects an operating state of the voltage conversion circuit such that the data driving voltage VAA is changed, and the data driving voltage VAA is adjusted to be a value identical to the set value of the data driving voltage VAA stored in the data register 131. Then, the adjusted data driving voltage VAA is outputted. An adjustment of the gamma voltage Vgamma is the same as the adjustment of the data driving voltage VAA.

Timing signals of the data driving voltage VAA and the gamma voltage Vgamma outputted to the source driving chip 12 by the voltage calibrating module 132 are provided by the timing controller 11.

In an embodiment, referring to FIG. 2, the source driving chip 12 further includes an output buffer 122 connected to the voltage comparator 121, and the output buffer 122 is configured to output the driving signal to the display panel 20.

When the voltage comparator 121 determines ΔU to be within the predetermined range, the output buffer 122 outputs the driving signal; When the voltage comparator 121 determines ΔU to be out of the predetermined range, the voltage comparator 121 outputs the voltage difference signal to the timing controller 11.

In an embodiment, the source driving chip 12 may further include a second data register 123 configured to store the data driving voltage VAA and the gamma voltage Vgamma outputted by the power management circuit chip 13.

The second data register 123 is connected to the voltage comparator 121, and the voltage comparator 121 obtains the data driving voltage VAA and the gamma voltage Vgamma stored in the second data register 123.

The source driving chip 12 may further include an analog-to-digital converter, which can be used to convert an analog signal of the voltage difference ΔU into a digital signal representing a specific value of the voltage difference ΔU.

In addition to the data driving voltage VAA and/or the gamma voltage Vgamma, the power management circuit chip 13 further generates other voltages required by the driving circuit 10, such as a power voltage VDD for supplying power electricity to the timing controller 11, a switching-off voltage VGL for a switch thin-film transistor (TFT) of the display panel 20, a switching-on voltage VGH for the switch TFT, and a common electrode voltage Vcom in the display panel. All the foregoing voltages can be stored in the data register 131.

In an embodiment, the timing controller 11 can be connected to the power management circuit chip 13 via an Inter-Integrated Circuit (I2C) bus. By I2C channels, the timing controller 11 transmits digital signals to the power management circuit chip 13 to rewrite the voltage settings of the data driving voltage VAA and the gamma voltage Vgamma of the data register 131.

In an embodiment, the timing controller rewrites at least one of the data driving voltage VAA and the gamma voltage Vgamma in the data register 131 to enable the voltage difference ΔU between the data driving voltage VAA and the gamma voltage Vgamma to be within the threshold range.

Specifically, it can also rewrite only the set value of the data driving voltage VAA in the data register 131 to make ι÷U be within the threshold range.

In other embodiments, it can also rewrite only the set value of the gamma voltage Vgamma in the data register 131, or it can also rewrite both the set values of the data driving voltage VAA and the gamma voltage Vgamma in the data register 131, as long as the voltage difference is ensured to be within the predetermined range.

In an embodiment, each source driving chip 12 is connected to the timing controller 11 via a peer-to-peer (P2P) bus. Based on the property that P2P transmission protocol is directed to bidirectional communication, the source driving chip 12 can feed back to the timing controller 11 a message indicating that the voltage difference ΔU exceeds the threshold range, the timing controller 11 then rewrites the register of the power management circuit chip 13 to adjust outputted values of the data driving voltage VAA and gamma voltage Vgamma to provide for the source driving chip 12 at the backend. This forms close-loop detection and control, thereby realizing real-time detecting and altering the voltage difference ΔU. Therefore, the problem of abnormal heavy loading image screen can be solved for large-scale display panels without an addition of hardware-designed circuits and manufacture cost.

Figure 3:
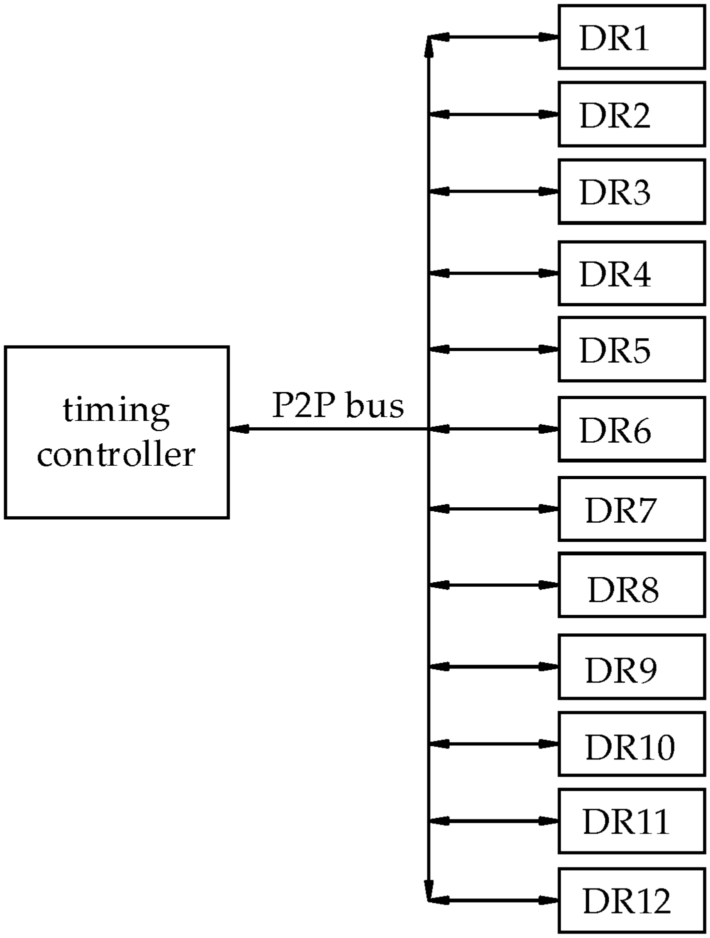
FIG. 3 is a schematic diagram illustrating a connection between source driving chips and a timing controller provided in an embodiment of the present invention.

With reference to FIG. 3, an embodiment of the present invention is illustrated by twelve source driving chips DR1 to DR12 for example. The source driving chips share a same data driving voltage VAA and gamma voltage Vgamma. The twelve source driving chips DR1 to DR12 provide data signals for all the data lines in the display panel 20.

Figure 4:
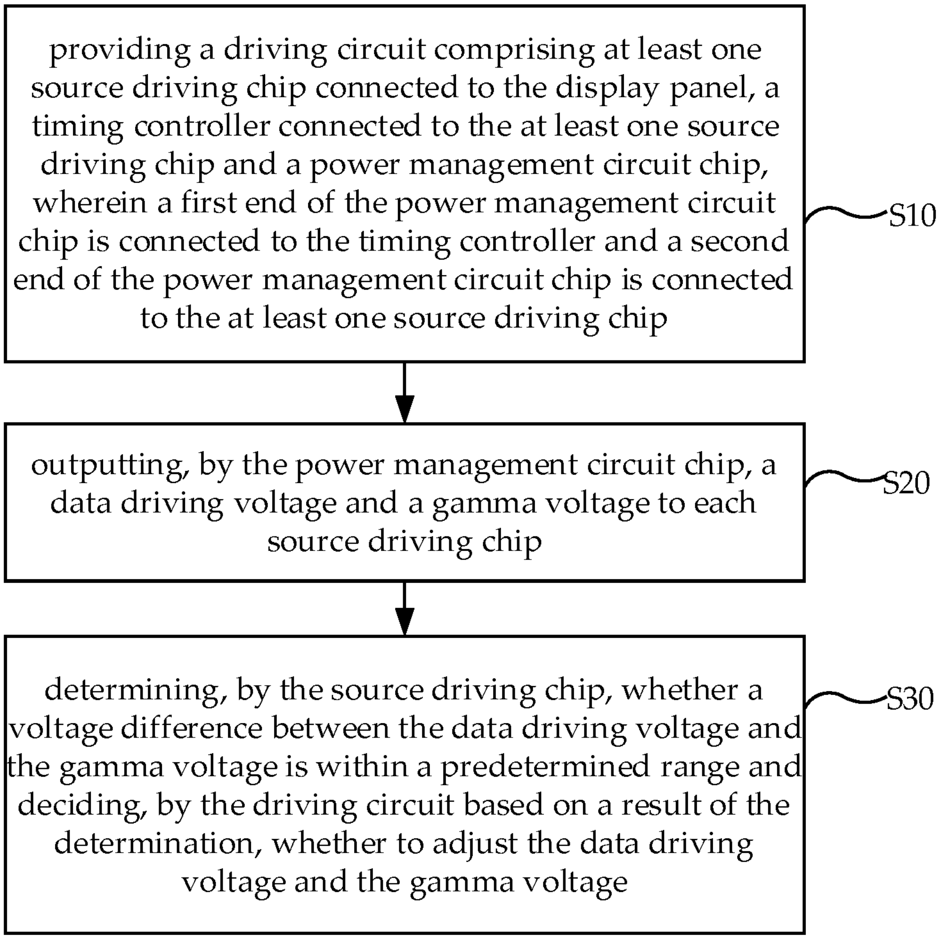
FIG. 4 is a flowchart of a driving circuit of a driving circuit provided in an embodiment of the present invention.

Referring to FIG. 4, an embodiment of the present invention further provides a driving method for using the foregoing driving circuit to drive the display panel 20. The driving method includes:

S10, providing a driving circuit 10 including at least one source driving chip 12 connected to the display panel 20, a timing controller 11 connected to the at least one source driving chip 12 and a power management circuit chip 13, wherein a first end of the power management circuit chip 13 is connected to the timing controller 11 and a second end of the power management circuit chip 13 is connected to the at least one source driving chip 12;

S20, outputting, by the power management circuit chip 13, a data driving voltage VAA and a gamma voltage Vgamma to each source driving chip 12; and S30, determining, by the source driving chip 12, whether the data driving voltage VAA and the gamma voltage Vgamma are within a predetermined range and deciding, by the driving circuit 10 based on a result of the determination, whether to adjust the data driving voltage Vgamma and the gamma voltage Vgamma.

In an embodiment, S30 includes determining, by a voltage comparator 121 of the source driving chip 12, whether the voltage difference is within the predetermined range; if yes, outputting, by the source driving chip 12, a driving signal to the display panel 20; and if no, outputting, by the source driving chip 12, a voltage difference signal to the timing controller 11, transmitting, by the timing controller 11, a control signal, and adjusting, by the driving circuit 10, the driving voltage and/or the gamma voltage based on the control signal.

The timing controller 11 transmits the control signal to rewrite set values of the data driving voltage and/or the gamma voltage stored in a data register 131 of the power management circuit chip 13 to adjust outputted driving voltage and/or gamma voltage.

Figure 5:
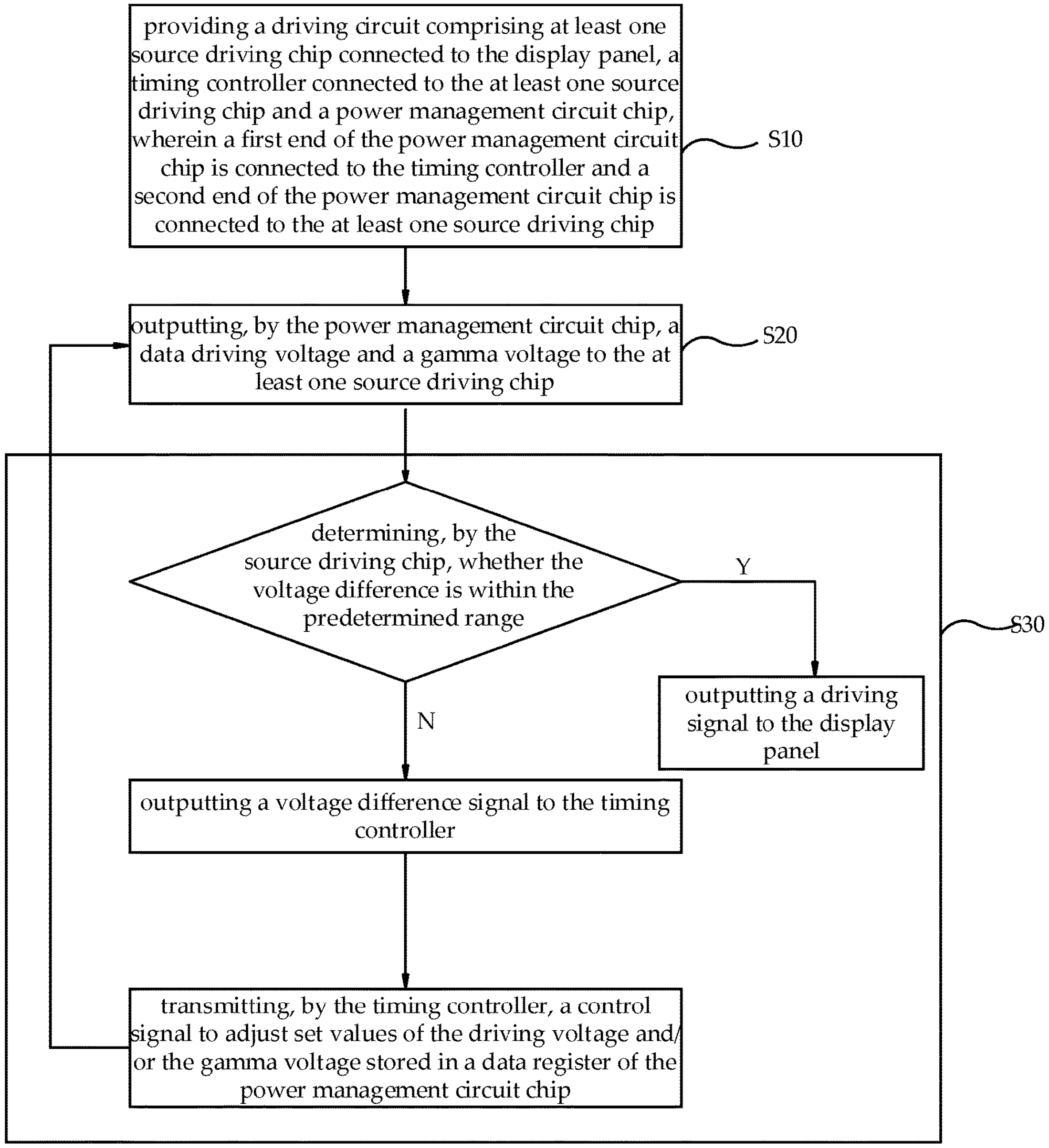
FIG. 5 is a flowchart of a driving circuit of a driving circuit provided in another embodiment of the present invention.

Specifically, referring to FIG. 5, in S30, the source driving chip 12 determines whether the voltage difference ΔU is within the threshold range. If yes, the source driving chip 12 outputs a driving signal to the display panel 20; If no, the source driving chip 12 outputs a voltage difference signal to the timing controller 11 such that the timing controller transmits the control signal to rewrite the set values of the data driving voltage and/or the gamma voltage stored in the data register 131 of the power management circuit chip.

The power management circuit chip 13 provides for the source driving chip 12 an original version of the data driving voltage VAA and the gamma voltage Vgamma and a calibrated version of the data driving voltage VAA and the gamma voltage Vgamma.

In an embodiment, the method includes the followings. At first, based on original set values of the data driving voltage VAA and the gamma voltage Vgamma stored in the data register of the power management circuit chip 13, the power management circuit chip 13 provides the data driving voltage VAA and the gamma voltage Vgamma for the source driving chip.

After that, a voltage comparator 121 of the source driving chip 12 estimates the voltage difference ΔU between the data driving voltage VAA and the gamma voltage Vgamma. If the voltage difference ΔU is within a predetermined range, an output buffer 122 of the source driving chip 12 outputs a data voltage Vdata to the display panel 20. If the voltage difference ΔU exceeds the predetermined range, the voltage comparator 121 transmits the voltage difference signal to the timing controller 11. Preferably, the predetermined range of the present embodiment is set as greater than 0.8V and less than 2V.

After that, the timing controller 11 transmits the control signal to the data register 131 in the power management circuit chip 13 to rewrite the set values of the data driving voltage VAA and the gamma voltage Vgamma stored in the data register 131. Finally, based on the changed set values, a voltage calibrating module 131 adjusts the data driving voltage VAA and the gamma voltage Vgamma so as to input to the source driving chip 12 with the adjusted data driving voltage VAA and gamma voltage Vgamma that have ΔU satisfying the requirement.

This implementation of the driving method can solve the problem of abnormal heavy loading image screen for large-scale display panels without a need to add new hardware-designed circuits and add extra cost.

Referring to FIG. 2, an embodiment of the present invention further provides a display device 100 including a display panel 20 and a driving circuit 10 according any of the afore-described embodiments. The driving circuit 10 is connected to the display panel 20. The structure of the driving circuit 10 can be referred to the descriptions on above embodiments, and is not detailed herein.

The display panel 20 can be a liquid crystal display panel. The embodiments of the present invention are particularly applicable to the driving of large-scaled liquid crystal display panel. In other embodiments, the display panel 20 can also be other types of display panels.

Above all, in the present application, the source driving chip 12 can feed back to the timing controller 11 a message indicating the voltage difference ΔU between the data driving voltage VAA and the gamma voltage Vgamma, and then the timing controller 11 transmits a control signal to the power management circuit chip 13 to rewrite set values of the data driving voltage and the gamma voltage in the power management circuit chip 13 so as to adjust values of the data driving voltage and the gamma voltage outputted by the power management circuit chip 13 and provide it to the source driving chip 12 at the backend, thereby realizing real-time detecting and altering ΔU and ensuring ΔU to be within a reasonable predetermined range. Therefore, it is ensured that the display panel display images normally even on a heavy loading screen and overheating of the source driving chip 12 is avoided. In addition, the driving circuit provided in the present invention will not add hardware-designed circuits and manufacture cost.

It should be understood that those of ordinary skill in the art may make equivalent modifications or variations according to the technical schemes and invention concepts of the present application, but all such modifications and variations should be within the appended claims of the present application.

The invention claimed is:

1. A driving circuit, for driving a display panel, comprising:

at least one source driving chip, connected to the display panel;

a timing controller, connected to the at least one source driving chip; and a power management circuit chip, comprising a first end and a second end, wherein the first end is connected to the timing controller and the second end is connected to the at least one source driving chip, and the power management circuit chip outputs a data driving voltage and a gamma voltage to the at least one source driving chip, wherein the source driving chip determines whether a voltage difference between the data driving voltage and the gamma voltage is within a predetermined range, and based on a result of the determination the driving circuit decides whether to adjust the data driving voltage and the gamma voltage, wherein the source driving chip determines whether the voltage difference is within the predetermined range, and if yes, the source driving chip outputs a driving signal to the display panel; if no, outputting, by the source driving chip, a voltage difference signal to the timing controller, transmitting, by the timing controller, a control signal, and adjusting, by the driving circuit, the driving voltage and/or the gamma voltage based on the control signal.

2. The driving circuit of claim 1, wherein the source driving chip comprises a voltage comparator, and the voltage comparator is configured to compare the voltage difference between the data driving voltage and the gamma voltage that are received by the source driving chip and determine whether the voltage difference is within the predetermined range.

3. The driving circuit of claim 2, wherein the source driving chip further comprises an output buffer connected to the voltage comparator, and the output buffer is configured to output the driving signal to the display panel.

4. The driving circuit of claim 1, wherein the power management circuit chip comprises a data register, and the data register is configured to store set values of the data driving voltage and the gamma voltage.

5. The driving circuit of claim 4, wherein the timing controller transmits the control signal to rewrite the set values of the data driving voltage and/or the gamma voltage stored in the data register.

6. The driving circuit of claim 5, wherein the power management circuit chip further comprises a voltage calibrating module connected to the data register, and based on the rewritten set values of the data driving voltage and/or the gamma voltage, the voltage calibrating module adjusts the outputted data driving voltage and/or gamma voltage.

7. The driving circuit of claim 6, wherein the voltage calibrating module comprises a control module and a voltage conversion circuit, and the control module and the voltage conversion circuit are configured to adjust the outputted data driving voltage and/or gamma voltage.

8. The driving circuit of claim 1, wherein both the voltage difference signal and the control signal are digital signals.

9. A driving method of a display panel, comprising:

S10, providing a driving circuit comprising at least one source driving chip connected to the display panel, a timing controller connected to the at least one source driving chip and a power management circuit chip, wherein a first end of the power management circuit chip is connected to the timing controller and a second end of the power management circuit chip is connected to the at least one source driving chip;

S20, outputting, by the power management circuit chip, a data driving voltage and a gamma voltage to each source driving chip; and S30, determining, by the source driving chip, whether a voltage difference between the data driving voltage and the gamma voltage is within a predetermined range and deciding, by the driving circuit based on a result of the determination, whether to adjust the data driving voltage and the gamma voltage, wherein the S30 comprises:

determining, by a voltage comparator of the source driving chip, whether the voltage difference is within the predetermined range;

if yes, outputting, by the source driving chip, a driving signal to the display panel; and if no, outputting, by the source driving chip, a voltage difference signal to the timing controller, transmitting, by the timing controller, a control signal, and adjusting, by the driving circuit, the driving voltage and/or the gamma voltage based on the control signal.

10. A display device, comprising a display panel and a driving circuit connected to the display panel, the driving circuit comprising:

at least one source driving chip, connected to the display panel;

a timing controller, connected to the at least one source driving chip; and a power management circuit chip, comprising a first end and a second end, wherein the first end is connected to the timing controller and the second end is connected to the at least one source driving chip, and the power management circuit chip outputs a data driving voltage and a gamma voltage to the at least one source driving chip, wherein the source driving chip determines whether a voltage difference between the data driving voltage and the gamma voltage is within a predetermined range, and based on a result of the determination the driving circuit decides whether to adjust the data driving voltage and the gamma voltage, wherein the source driving chip determines whether the voltage difference is within the predetermined range, and if yes, the source driving chip outputs a driving signal to the display panel; if no, outputting, by the source driving chip, a voltage difference signal to the timing controller, transmitting, by the timing controller, a control signal, and adjusting, by the driving circuit, the driving voltage and/or the gamma voltage based on the control signal.

11. The display device of claim 10, wherein the source driving chip comprises a voltage comparator, and the voltage comparator is configured to compare the voltage difference between the data driving voltage and the gamma voltage that are received by the source driving chip and determine whether the voltage difference is within the predetermined range.

12. The display device of claim 11, wherein the source driving chip further comprises an output buffer connected to the voltage comparator, and the output buffer is configured to output the driving signal to the display panel.

13. The display device of claim 10, wherein the power management circuit chip comprises a data register, and the data register is configured to store set values of the data driving voltage and the gamma voltage.

14. The display device of claim 13, wherein the timing controller transmits the control signal to rewrite the set values of the data driving voltage and/or the gamma voltage stored in the data register.

15. The display device of claim 14, wherein the power management circuit chip further comprises a voltage calibrating module connected to the data register, and based on the rewritten set values of the data driving voltage and/or the gamma voltage, the voltage calibrating module adjusts the outputted data driving voltage and/or gamma voltage.

16. The display device of claim 15, wherein the voltage calibrating module comprises a control module and a voltage conversion circuit, and the control module and the voltage conversion circuit are configured to adjust the outputted data driving voltage and/or gamma voltage.

17. The display device of claim 10, wherein both the voltage difference signal and the control signal are digital signals.

* * * * *